United States Patent [19]
Boyesen

[11] 4,235,206
[45] * Nov. 25, 1980

[54] TWO CYCLE INTERNAL COMBUSTION ENGINE

[75] Inventor: Eyvind Boyesen, Kempton, Pa.

[73] Assignee: Performance Industries, Inc., Kempton, Pa.

[*] Notice: The portion of the term of this patent subsequent to Sep. 16, 1992, has been disclaimed.

[21] Appl. No.: 969,355

[22] Filed: Dec. 14, 1978

Related U.S. Application Data

[60] Continuation of Ser. No. 839,180, Oct. 4, 1977, Pat. No. 4,161,163, which is a continuation-in-part of Ser. No. 674,102, Apr. 6, 1976, Pat. No. 4,062,331, and Ser. No. 586,138, Jun. 11, 1975, Pat. No. 4,051,820, which is a continuation-in-part of Ser. No. 375,065, Jun. 29, 1973, Pat. No. 3,905,340, which is a continuation-in-part of Ser. No. 361,407, May 18, 1973, abandoned, which is a continuation-in-part of Ser. No. 282,734, Aug. 22, 1972, abandoned, said Ser. No. 375,065, is a division of Ser. No. 416,213, Nov. 15, 1973, Pat. No. 4,000,723, and Ser. No. 416,215, Nov. 15, 1973, Pat. No. 3,905,341.

[51] Int. Cl.³ .................. F02B 33/04; F16K 15/16
[52] U.S. Cl. ........................... 123/73 V; 123/73 A; 137/855; 137/857
[58] Field of Search ............... 123/73 V, 73 A, 73 R; 137/855, 856, 857, 512.15

[56] References Cited
U.S. PATENT DOCUMENTS

| | | | |
|---|---|---|---|
| 1,599,414 | 9/1926 | Huff | 137/857 |
| 3,687,118 | 8/1972 | Nomura | 123/73 R |
| 3,905,340 | 9/1975 | Boyesen | 123/73 V |

*Primary Examiner*—Wendell E. Burns
*Attorney, Agent, or Firm*—John T. Synnestvedt; Kenneth P. Synnestvedt

[57] ABSTRACT

A two-cycle internal combustion engine having reed-type intake valving, and especially configured and positioned intake and injector porting, with the porting constructed and arranged to improve various of the operating characteristics of the engine, and particularly adapted to increase the effectiveness of the injection through the injector porting.

1 Claim, 8 Drawing Figures

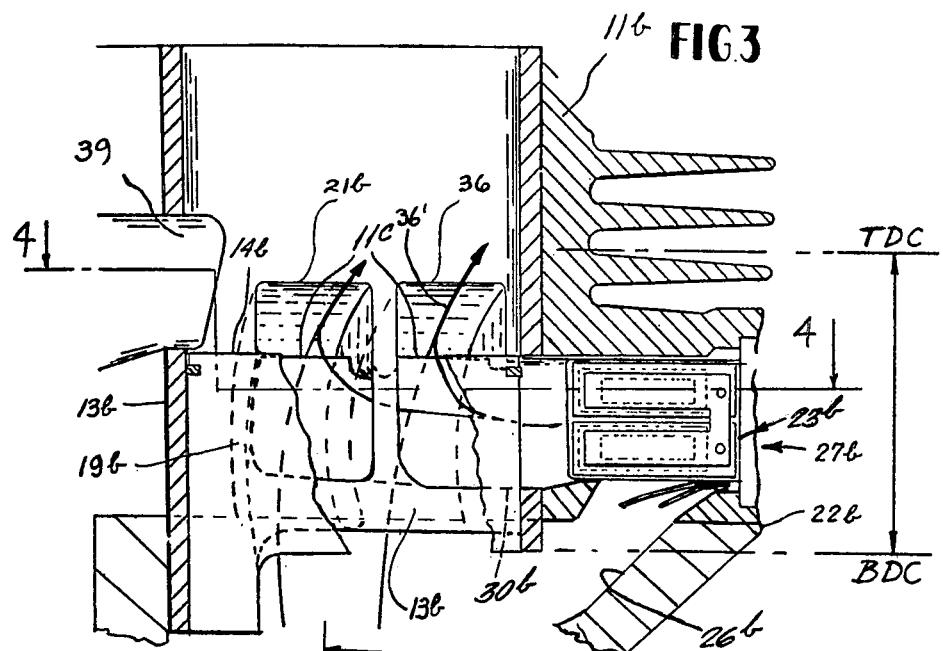
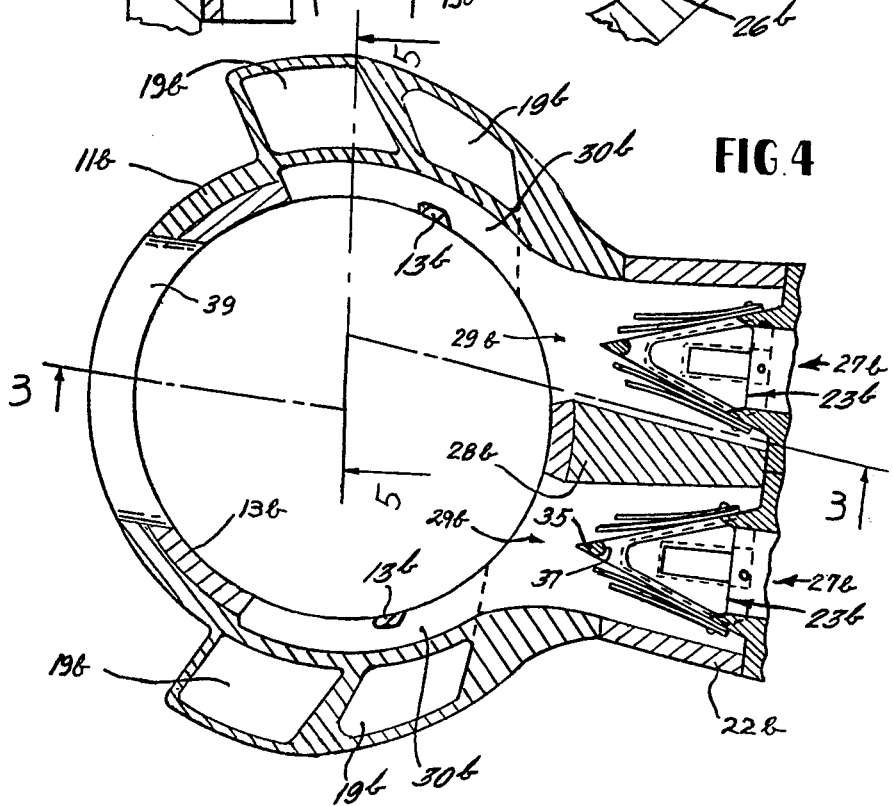

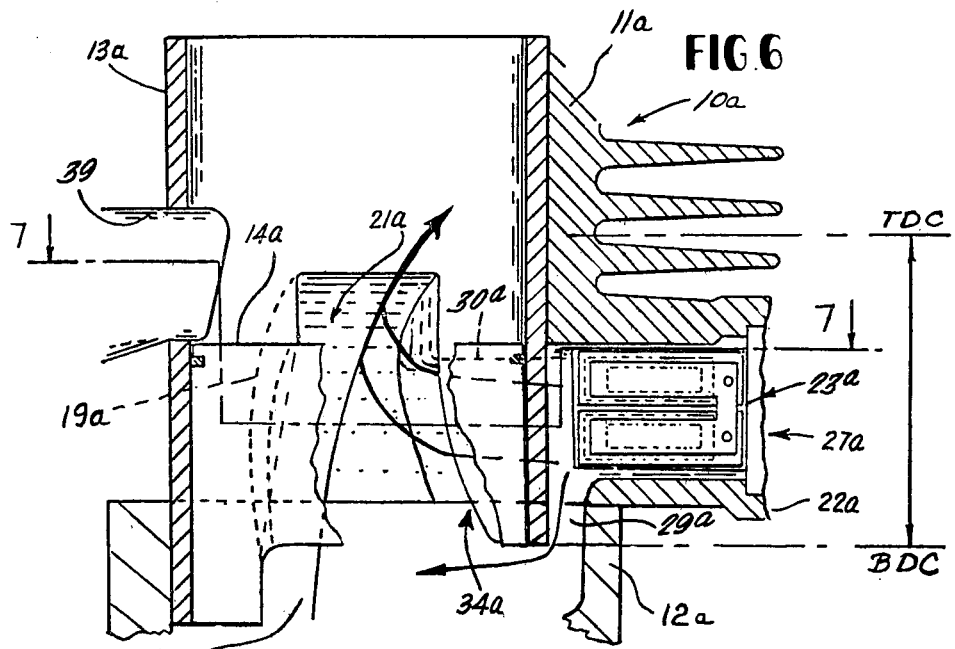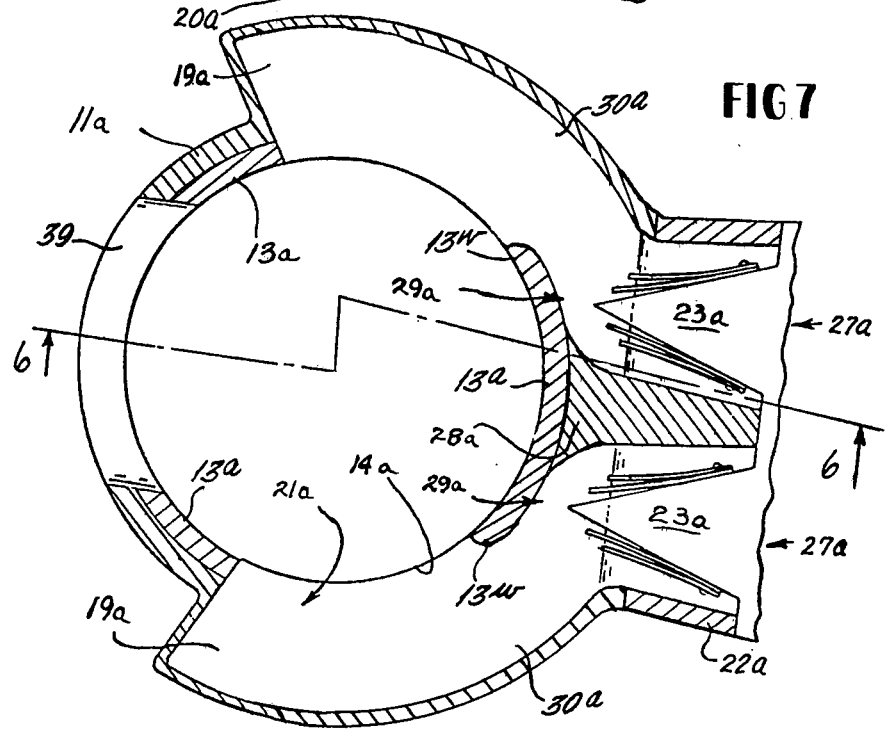

TWO CYCLE INTERNAL COMBUSTION ENGINE

CROSS REFERENCES:

The present application is a continuation of my prior application Ser. No. 839,180, filed Oct. 4, 1977 now U.S. Pat. No. 4,161,163, which is a continuation-in-part of my application Ser. No. 674,102, filed Apr. 6, 1976, and application Ser. No. 586,138, filed June 11, 1975, which latter application in turn is a continuation-in-part of my application Ser. No. 375,065, filed June 29, 1973, which in turn is a continuation-in-part of my prior application Ser. No. 282,734, filed Aug. 22, 1972, now abandoned, and of my prior application Ser. No. 361,407, filed May 18, 1973, now abandoned. Said application Ser. No. 375,065 has now matured as U.S. Pat. No. 3,905,340. Applications bearing Ser. Nos. 416,213, and 416,215, filed Nov. 15, 1973, are divisions of Ser. No. 375,065 and, said application Ser. No. 416,215 is now U.S. Pat. No. 3,905,341, and said application Ser. No. 416,213 is now U.S. Pat. No. 4,000,723. Prior application Ser. No. 586,138 is now U.S. Pat. No. 4,051,820; and application Ser. No. 674,102 is now U.S. Pat. No. 4,062,331.

BACKGROUND OF THE INVENTION

As in my prior patents and applications just identified, the present invention has the general objective of improving the performance, power output, flexibility, response and fuel economy of internal combustion engines, epecially two-cycle, variable speed, crankcase compression engines as used for a variety of purposes, for example on motorcycles.

While having important features in common with certain of the prior patents and applications identified above, the present application and its parent application Ser. No. 839,180 contemplate alternative arrangements and further improvements as compared with my earlier patents and applications, as is more fully explained hereinafter with reference to the drawings of the present application.

In considering some of the major general objectives of the invention it is first noted that performance characteristics of engines, and especially of two-cycle engines, are determined in large part by the fuel intake capabilities, which are in turn governed by the total cross-sectional area of the intake passages, the length and the directness of the path of flow of the incoming fuel, the duration of the intake, the portion of the cycle during which intake occurs, and the responsiveness of the action of the intake valves. With these features in mind the present invention, and the inventions of my above identified patents and applications, provide novel arrangements and interrelationships of intake porting and reed valves which mutually contribute to an increase in the cross-sectional intake flow area for the fuel, and to an extension of the portion of the cycle during which intake of fuel occurs, and which shorten and make more direct the flow path of the incoming fuel.

The features of the present invention which contribute to the foregoing general objectives are explained in detail below. However, it is first noted that a brief description of the prior art in this field is included in my prior patents and applications. In this connection see for example the description in my U.S. Pat. No. 3,905,340. For the purposes of the present disclosure, the following brief additional discussion will be helpful as background material.

Important aspects of my developments, disclosed and claimed in my earlier cases, particularly in U.S. Pat. No. 3,905,341 and in applications Ser. No. 674,102 and Ser. No. 586,138, have to do with what I have referred to as "injector" ports, and with the fact that such ports may advantageously be used in combination with other novel intake porting and with the passages commonly used in the industry to transfer the compressed fuel mixture from the crankcase to the combustion side of the piston.

Certain figures of drawings common to my application Ser. No. 586,138 and to U.S. Pat. No. 3,905,341, namely FIGS. 9 and 10, disclose the novel use of injector ports, while FIG. 11 represents, graphically, the improvements, in power curve which are achievable by utilizing one form of injector porting. FIGS. 12 and 13 of my copending application Ser. No. 586,138 disclose another improvement in injector porting. Still other arrangements shown in my application Ser. No. 674,102 also serve these purposes. While these several arrangements of my prior applications have yielded very beneficial results, I have been able to devise apparatus for utilizing injector ports, and novel transfer and intake porting, to still greater advantage, as will now be explained.

SUMMARY OF THE INVENTION

Broadly, it is the objective of this invention to maximize the power output in two stroke engines, and to broaden the power band.

It is also an object of the present invention, in common with my prior application Ser. No. 674,102, to optimize the intake of fuel into the space below the piston which communicates with the crankcase, by utilizing intake porting configured and positioned to provide for introduction of fuel just beneath the piston and into said space throughout the entire stroke of the piston, from substantially the bottom dead center position to substantially the top dead center position thereof, and to provide such extended intake augmented by the use of injector porting so connected to both the intake and the transfer passages as to draw fuel from the intake chamber and supply it directly to the transfer passage during the transfer stroke.

In one aspect of the invention, both injector and intake porting are made in the simplest possible manner, taking the form of a cavity provided in the cylinder wall and openly facing the outer side portion of the piston; and in addition, it is contemplated that the transfer and injector passages be shaped and disposed to establish Venturi action at the point where the injector port joins the transfer passage, thereby further enhancing the induction of fuel into the combustion chamber of the engine.

In all embodiments of the invention, provision is made for transfer of compressed fuel from the space below the piston including the crankcase to the combustion chamber; and at the same time in all embodiments, intake porting is provided for introducing fuel from the fuel supply chamber into the space below the piston independently of the fuel flow through the transfer passage or passages. Moreover, at least some fuel intake or fuel supply passage means is provided in such position with relation to the piston that the supply passage means is not closed by the piston at any point throughout the cycle of operation of the engine. This provision for fuel intake independently of the transfer of fuel from the crankcase to the combustion chamber enhances the fuel supply, because at no point in the cycle of operation is it necessary for the flow in the intake passage to reverse its direction.

As a result of all these improvements, it has been possible to provide machines of such power output—for a given cubic capacity of the engine—as to insure greater acceleration from a standing start, than is achieved by other machines in the racing field.

To the foregoing general ends I provide, and disclose and claim herein, improved arrangements in each of which the injector ports are used in combination with reed valving and intake porting, uniquely configured and positioned to provide for introduction of fuel immediately beneath the piston, and into the crankcase, throughout the entire upward stroke of the piston, from substantially its bottom dead center position to substantially its top dead center position. This arrangement, in combination with my unique injector ports which draw fluid from the intake chamber and supply it directly to the transfer passages (which latter are also feeding to the combustion chamber fuel compressed in the crankcase), optimizes fuel delivery throughout the cycle, and thereby maximizes power.

I have provided a reed valve engine using my injector porting in combination with intake porting disposed high in the cylinder, and yet having sufficient dimension, in the direction of the cylinder axis, to insure introduction of fuel just beneath the piston even at the start of the upward stroke thereof and preferably continuing throughout the entire upward stroke thereof. In certain embodiments of the invention disclosed herein, the valve mechanism, which preferably takes the form of reed valves, includes separate reed valves delivering fuel into separate intake passages, and as will be explained more fully hereinafter, the reed valves associated with each of the separate passages are so arranged as to enhance the directness and smoothness of flow of the fuel from the supply zone into and through the intake passages.

Another important feature of the present invention is the provision of cooperating injector and transfer passages, with each injector passage communicating with a transfer passage at a point closely adjacent to the transfer port entering the combustion chamber above the piston. In addition, the invention contemplates use of transfer ports having progressively diminishing cross-sectional area toward the port into the cylinder and with the injector passage communicating with the transfer passage in a region of reduced cross section preferably very close to the port into the cylinder. Thus, the injector passage has a wall lying between the injector and the transfer passages with one edge of the wall positioned close to one edge of the transfer port, and these relationships establishing a Venturi action in consequence of which the flow of the fuel from the transfer passage into the cylinder increases the injection action through the injector passage.

The significance of these improvements will be better appreciated when it is understood that prior art apparatus, has been influenced by an over-emphasis on the compression of fuel in the crankcase, during the downward portion of the piston stroke. There is, of course, elevation of pressure in the crankcase. However, this is not the most important consideration, particularly since the crankcase volume is substantially occupied by the crankshaft, connecting rod, and counterweight. The developmental work which has led to my inventions has been predicated upon recognition of the fact that, as the piston moves upward in the cylinder, there is instantaneous creation of a void immediately under the piston crown, and that this void, at top dead center position is of considerable volume, particularly in engines of relatively large displacement. Accordingly, I have recognized that the reed valving which provides for fuel feed will operate most efficiently, to introduce a charge available for transfer, if the valving and its cylinder intake porting is located high enough in the cylinder to permit the introduction of fuel immediately beneath or close to the piston, even at the start of the upward stroke and throughout its entire upward stroke. By suitable extension of the intake porting, it is possible and advantageous, to introduce fuel, beneath the inlet edge of the piston, even at bottom dead center position and throughout the entire upward stroke.

With the foregoing in mind, in a particularly advantageous engine with these features, I provide intake porting which has a dimension, in the direction of the cylinder axis, equal to and preferably slightly greater than the length of the piston stroke.

As will become apparent as the description proceeds, my improved apparatus is also featured by virtual elimination of the short circuiting of fuel which has occurred in certain engines. For example, in certain engines using booster, or so-called "auxiliary scavanging" passages, there has been a loss of efficiency as a result of some of the fuel, inletted into the cylinder through the transfer porting, flowing back through the booster passage and into the intake area when the piston is close to the bottom dead center position. In contrast, as above mentioned, in the arrangements provided by the present invention the flow is a one-way flow in all passages, there being no tendency or necessity for flow reversal in any of the passages.

In certain of the embodiments described hereinafter, the injector and intake porting have portions in common, which portions are comprised, at least in major part, by cavities recessed in the wall of the cylinder liner or other housing, and openly confronting outside surface portions of the piston.

BRIEF DESCRIPTION OF THE DRAWINGS

How the foregoing and other objects and advantages are achieved, will be clear from the following detailed description referring to the accompanying drawings, in which:

FIG. 3 is a somewhat diagrammatic sectional view generally similar to FIG. 1, but omitting the crankcase, the view being taken along the line 3—3 of FIG. 4 and illustrating another embodiment of the invention;

FIG. 4 is a sectional view taken along the line 4—4 of FIG. 3;

FIGS. 6 and 7 are views similar to FIGS. 3 and 4 but illustrating still another embodiment of certain features of the invention.

DETAILED DESCRIPTION OF THE ILLUSTRATED EMBODIMENTS

Figure 1:
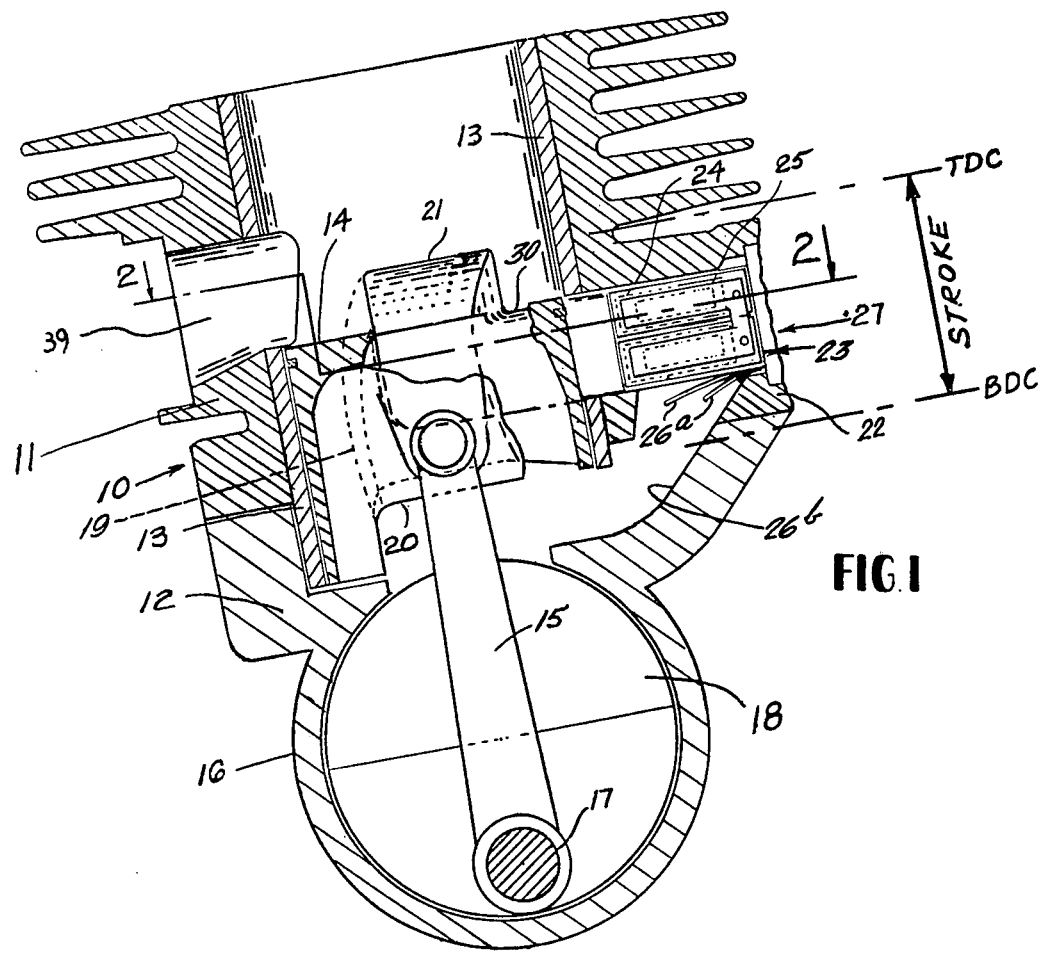
FIG. 1 is a view in section, taken along the line 1—1 of FIG. 2, and illustrating a two-cycle reed valve engine having intake and injector porting characteristic of this invention and also having improved valving.
Figure 2:
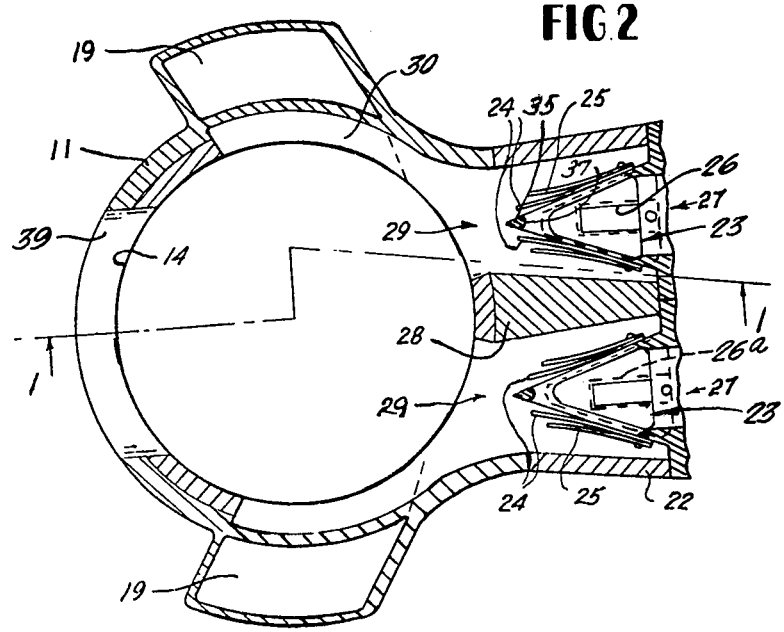
FIG. 2 is a sectional view taken along the line 2—2 of FIG. 1.

First making reference to the embodiment of FIGS. 1 and 2, there is shown a somewhat diagrammatic representation of a two-cycle piston engine comprised of a housing 10 the upper portion of which defines a cylinder 11 and the lower portion of which defines a crankcase 12. The upper, annular portion of the crankcase interfits with cylinder liner structure 13, which extends throughout the height of the cylinder 11, except where omitted or removed to provide certain porting (including the usual exhaust port 39), and projects beneath it in the manner plain from FIG. 1. While the use of a liner is preferred, it is not essential, and for most purposes of the present invention, the liner can be considered as a part of the cylinder 11, which, in turn, forms the upper portion of housing 10. A piston 14 is mounted for reciprocation within the cylinder and its connecting rod 15 is eccentrically mounted upon the crankshaft within the lower portion 16 of the crankcase, as indicated at 17. As is conventional, a circular counterweight is preferably employed, as shown at 18. The cylinder 11 includes transfer passages 19, the lower end of each of which is in open communication with the crankcase and the upper end of each of which terminates in a port 21 opening through the cylinder wall and into the space lying to the combustion side of piston 14. As will be understood, it is preferred to employ at least two such transfer passages (see FIG. 2) and one thereof appears in FIG. 1 at 19, its lower end 20 having the stated open communication with the crankcase and its upper end terminating in the aforesaid port shown at 21. Conveniently, and as shown, the passage 19 is provided in the wall of cylinder 11, lying behind the liner 13, which is apertured to provide the lower communication at 20 as well as the upper port 21. As is conventional, combustable gases inletted during the upward stroke are pressurized beneath the piston and in the crankcase, by the piston throughout its downward stroke toward the bottom dead center position illustrated, and the gases flow from the crankcase through openings 20, passages 19 and ports 21, from whence the gases enter the cylinder above the piston 14.

The cylinder 11 also includes an intake chamber 22 which leads to a source to fuel (not illustrated) and which chamber contains the reed valve means 23, which is adapted to open and provide for intake of fuel throughout the entire upward stroke of the piston, and to close, during the downward stroke of the piston, when the fuel inletted into the space below the piston is compressed. While, for certain purposes of the present invention, the reed valve means 23 may take a variety of forms known in the art, it is preferred that said reed valve means be of the so-called "vented" type described and claimed in my earlier disclosures and particularly in U.S. Pat. No. 3,905,340, to which reference may be had for a more detailed description, and further in that the valve means includes a plurality of valve assemblies as described hereinafter.

In the embodiment illustrated in FIGS. 1 and 2, the reed valve means 23 includes a reed valve body or cage of wedge shape, with the base end of the wedge open to the fuel supply passage, each inwardly inclined surface of the wedge-shaped cage having a pair of valve ports and each such port provided with primary and secondary reeds 24 and 25, the primary reeds being vented. This valving arrangement is more fully illustrated and described in my U.S. Pat. No. 3,905,340 above identified.

The opposite sides or ends (top and bottom) of the reed valve cage are closed by parallel triangular walls; and in the construction shown in FIGS. 1 and 2, the lower triangular wall of the valve cage is provided with a valve port 26 with which a pair of primary and secondary reed valves 26a are associated. In this case also, the primary reed is vented and is of the general type described in my prior U.S. Pat. No. 3,905,340.

From FIG. 2, it will be seen that the embodiment of FIGS. 1 and 2 includes two valve assemblies 23 arranged in side-by-side relation and positioned respectively in separate intake passages 29,29 lying at opposite sides of the dividing wall 28. From FIG. 1, it will also be seen that the structure of the cylinder and the crankcase still further includes intake passages 26b which are extended downwardly and inwardly from the lower side of each reed cage and which provide communication with the crankcase independently of the passages 29. The reed valves 26a of each valve assembly control the fuel flow from the interior of the reed cage into the associated intake passage 26b, this control and flow being independent of the fuel flow through the valves 24 and 25 into the passages 29,29. From FIG. 1, it will also be observed that the passages 26b communicate with the crankcase at a point below the piston skirt, even when the piston is in BDC, as in FIG. 1. The communication through the valves 26a, the passages 26b and into the crankcase, is thus maintained throughout the entire cycle of operation of the engine, and the flow would, of course, only be terminated when the compression is occurring in the crankcase, with consequent increase in pressure communicated back to the valve structure, thereby permitting the valves 26b to close.

It is desirable, as shown in FIGS. 1 and 2, that each reed cage be positioned with its apex extended in a vertical direction, i.e., in a direction parallelling the axis of the cylinder. When positioned in the manner just referred to, it will be clear from inspection of FIG. 2 that the flow of fuel through the valve ports controlled by the reed valves or petals 24 and 25 substantially directly enters the passages downstream of the valves, without the necessity for any extensive or sharp angular deflection. Similarly, the flow of the fuel into the inclined passages 26b when the reed valves 26a are opened is a substantially direct flow not requiring sharp or extensive angular change in direction. It is also to be noted that the apex member 35 of each reed cage has formed thereon an aerodynamic surface 37 which gives the member 35 a subsonic air foil or tear drop cross section. Thus formed, the member 35 offers minimum resistance to passage of incoming gas. These and other factors are of importance in maximizing the input of fuel into the engine.

The above mentioned directness of flow is enhanced by virtue of the arrangement as shown in which a pair of reed valve assemblies are mounted in separate generally parallel intake passages 27,27, as established by intervening wall structure including partition 28.

The intake porting cooperates with injector ports 30—30 which take the form of a pair of cavities each recessed in the wall of the cylinder in a position in which its open side confronts an outer side wall portion of the piston 14. These passages are of open construction, facilitating casting of the cylinder, making possible the employment of injector passages of larger cross section, and promoting smoother fluid flow. The outer side wall of piston 14 provides the inner wall limit (considered radially of the cylinder) of each injector port 30, as appears in FIG. 2. Each of the resultant cavities 30 provides one of the injector passages, and each interconnects one of the intake ports 29 with one of the transfer passages.

The injector passages 30 are similar in function to passages described and claimed in U.S. Pat. No. 3,905,341, being open throughout the complete cycle and serving to increase intake of fuel at higher RPM, especially above 6,000 to 7,000 RPM. When the charge contained in the crankcase 16 is pressurized by the descending piston 14, such charge flows upwardly through the transfer passages 19 to the transfer ports 21 and into the cylinder. This flow takes place at high velocity; and in accordance with Bernoulli's Principle, the rapidly moving charge in the passage 19 causes an eductor effect in the injector ports 30 which, in turn, causes relatively low pressure to exist in such ports. Accordingly, fuel charge is drawn from the intake tract downstream from the valve assembly, through the injector ports 30, and into the transfer passages 19. Here again, it is to be noted that the arrangement of the passages and ports provided by the present invention is such as to provide for only oneway flow in any one passage.

As is fully considered in U.S. Pat. No. 3,905,341, and graphically portrayed therein the peak horsepower of an engine is raised considerably by the use of such injector porting. By employing the porting, especially in combination with the extended intake porting characteristic of this invention, I have found that is possible to further increase fuel delivery throughout the cycle, and thereby to maximize power.

With reference to the orientation of the engine and reed valves as shown in FIG. 1, it should be kept in mind that in many installations, particularly in motorcycles and snowmobiles, the intake passage of a two-cycle engine, and also the engine itself, is somewhat inclined in a direction such that liquid fuel tends to flow from the carburetor (not shown) to the intake passage or chamber 22 and toward intake port 29. Such inclination is shown in FIG. 1.

The injector passages are each arranged at a substantial angle with respect to the axis of the adjacent transfer passage 19, which terminates in the transfer port 21. As will be appreciated, the port of each transfer passage lies above the piston 14 when the latter, as shown fragmentarily in FIG. 1, occupies its bottom dead center position (BDC).

Figure 5:
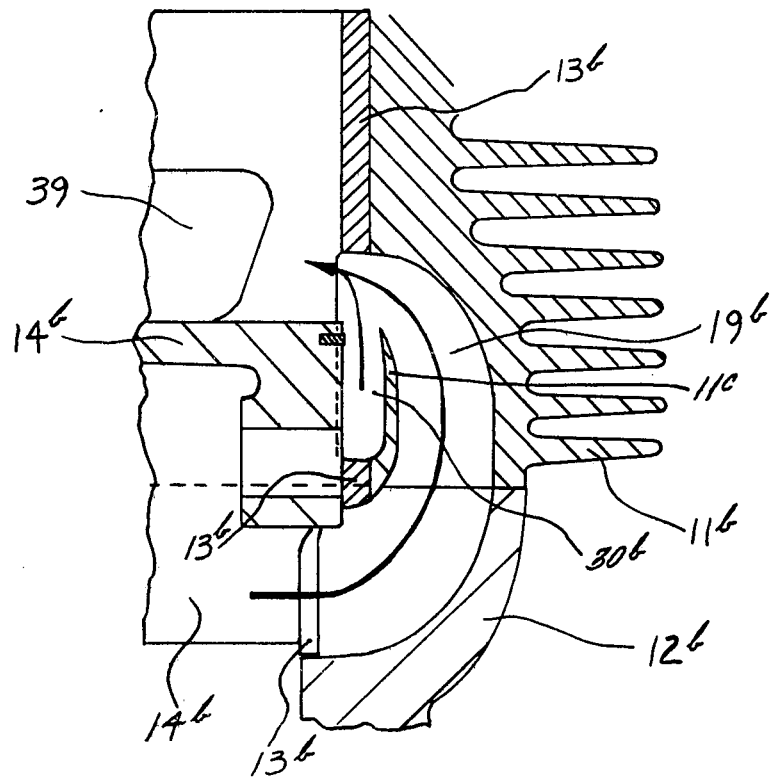
FIG. 5 is a vertical sectional view, taken substantially along the line 5—5 of FIG. 4.

Turning to the embodiment of FIGS. 3, 4 and 5, in which similar parts bear similar reference numerals including the subscript b, it will be seen that this second embodiment also utilizes injector porting which comprises a pair of passages 30b,30b formed by removing portions of liner 13b and of cylinder structure 11b. Again each injector passage 30b comprises a cavity in the cylinder and liner, and interconnects the intake porting 29b with transfer passages 19b.

In this embodiment, instead of employing only a single transfer port and passage at each side of the cylinder, a pair of adjacent ports are employed, each opening separately into the combustion space of the cylinder, as seen most clearly in FIG. 3. These ports are the transfer port 21b and an auxiliary inlet port 36 which has a dual function serving the purposes of a transfer port (see the flow arrow 36') and which also is fed directly from the intake porting 29b through the injector cavity just beneath the auxiliary port 36.

As in the first embodiment described, intake passages 26b are provided, extending downwardly from the lower side of the valve assemblies 23b, and as shown in FIGS. 3 and 4, the valve assemblies are provided with reed valves on the inclined walls as well as on the bottom walls in the same manner as described above in connection with FIGS. 1 and 2. Thus, in the embodiments of FIGS. 3, 4 and 5, provision is made for intake of fuel below the piston, even when the piston is at BDC.

In my new arrangement shown in FIGS. 3, 4 and 5, the auxiliary inlet—transfer port 36 is adjacent to the main transfer port 21b. Since both of the ports 21b and 36 are angularly spaced from the intake porting, in a plane transverse the cylinder axis, both "look" in generally the same direction across the cylinder, rather than generally confronting one another. Short circuiting is therefore eliminated, since the fuel, due to its velocity and kinetic energy, does not make the 180° turn which would be required to flow from the transfer port 21b into the auxiliary port 36.

It will be noted from FIGS. 3 and 4 that while the cylinder liner is cut out in areas providing various ports, a portion indicated at 13b at each side of the cylinder remains in order to provide cylinder wall surface for cooperation with the piston and support of the piston ring. The injector passages 30b extend from the inlet porting 29b to and beyond the liner strips 13b, in order to provide for injector passage communication with the two transfer passages 19b,19b at each side of the cylinder, one of which terminates in the transfer port 21b, and the other in the transfer/intake port 36.

One of these strips 13b of the cylinder liner also appears in the sectional view of FIG. 5 which further illustrates still another feature incorporated in the embodiment shown in FIGS. 3, 4 and 5. Note that in FIG. 5 one of the transfer passages 19b is illustrated, as is the associated injector passage 30b, and it will be seen that a wall 11c (see also FIG. 3) lies between the transfer passage and the injector passage. This wall has an edge lying close to the lower edge of the port of the transfer passage into the cylinder above the piston, the edge preferably also being tapered so that it is thin at its free edge; and because of this arrangement, and further because the cross-sectional flow area of the transfer passage 19b progressively diminishes as the port into the cylinder is approached, a substantial Venturi action is established, resulting in accentuating introduction of fuel from the injector port.

Figure 5A:
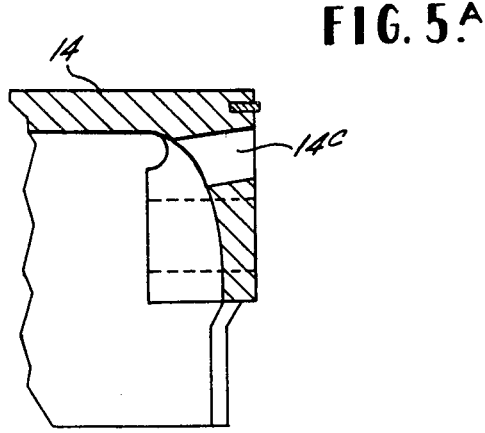
FIG. 5a is a fragmentary sectional view through a piston of the kind appearing in FIGS. 3, 4 and 5, this view being taken in a slightly different vertical plane as compared with FIG. 5, in order to illustrate an alternative feature, as will be further explained.

Turning now to FIG. 5a, there is here shown another feature which may be employed in embodiments such as shown in FIGS. 1 and 2 or in FIGS. 3, 4 and 5. In this alternative arrangement, the cylinder and valve structure remain the same as in FIGS. 3, 4 and 5; but a change is introduced in the piston. Thus, the piston is provided with ports, one of which appears at 14c in FIG. 5a. These ports are arranged just below the head of the piston and are positioned to communicate with injector passages 30b. At least one such piston port is preferably provided at each side of the piston, cooperating with an injector port at that side.

With this feature, and particularly where the transfer and the injector passages are arranged to provide for the Venturi effect referred to just above, the fuel entering the injector passage and delivered therethrough into the fuel being transferred from the crankcase into the combustion chamber, is further augmented by flow of fuel from the region immediately underneath the piston head. Stated in another way, these piston ports provide for immediate transfer of compressed fuel into the combustion chamber, this transfer being particularly effective since the space or volume immediately underneath the head of the piston would otherwise be stagnant, in the absence of such piston ports. The ports 14c thus provide a much more direct path for the delivery of compressed fuel from the zone just below the piston head into the injector passage and thus into the combustion space. It should be noted that the port 14c is so located that it is also in a zone which would be influenced by the Venturi action set up as a result of the flow through the transfer passage which progressively diminishes the cross-sectional area as the port into the cylinder is approached.

The embodiment of FIGS. 6 and 7 is in some respects similar to the embodiment of FIGS. 1 and 2 described above and in certain other respects is similar to the embodiment of FIGS. 1 and 2 of the companion application Ser. No. 674,102 above identified; and in addition, the embodiment of FIGS. 6 and 7 of the present application also discloses certain other features.

Most of the principal parts of the equipment are identified by the same reference numerals in FIGS. 6 and 7 as in the other Figures, but in this instance, most of the reference characters have the subscript a. The valving arrangement includes a pair of valve assemblies 23a,23a including reed valve cages and reed valves positioned in side-by-side intake passages 27a,27a which are separated by a central wall 28a similar to the wall 28 and 28b of FIGS. 2 and 4, respectively. However, in the embodiment of FIGS. 6 and 7, the transfer passages 19a and the connected injector passages 30a, although in part formed as recesses in the cylinder wall, are not open to the piston to the same extent as in FIGS. 2 and 4. On the contrary, the portion of the cylinder liner 13a in the region of the partition wall 28a extends through a much greater arc or through a larger portion of the circumference of the cylinder and piston than in the other embodiments. Indeed, the edge or wing portions 13w of this segment of the cylinder liner extend from the mean radial plane of the wall 28a in each circumferential direction to a point well beyond the axes of the inlet passages 27a,27a. The wings 13w thus supply more than half of the side-by-side fuel intake passages. This increase in the circumferential dimension of the segment of the cylinder liner adjacent to the wall 28a is of advantage in diminishing wear of the cylinder liner, and in this connection, it is pointed out that one of the principal areas where wear is concentrated on the cylinder liner is the area adjacent to the radial plane containing the wall 28a which plane is perpendicular to the wrist pin which interconnects the piston and connecting rod of the engine (see FIG. 1). Moreover, from examination of FIG. 7, it will be seen that much of the circumference of the cylinder liner is cut away in other areas in order to provide the exhaust port 39 and also the interconnected transfer/injector passages 19a–30a, so that the wings or extensions 13w of the liner serve to increase the overall liner area remaining in the cylinder for proper guiding of the reciprocating piston.

With regard to the embodiment of FIGS. 6 and 7, it is further pointed out that the intake passages 29a include portions extended generally horizontally and also the downwardly extending portion which appears in FIG. 6. In the embodiment of FIGS. 6 and 7, reed valves are provided only on the inclined side surfaces of the reed cage, and not on the bottom wall of the cage (as in the embodiments of FIGS. 1 to 5a); and in this respect, the embodiment of FIGS. 6 and 7 is comparable to the embodiment of FIGS. 1 and 2 of the companion application Ser. No. 674,102 identified above. Thus, in the embodiment of FIGS. 6 and 7, the intake passageways 29a are of such vertical extent as to remain open to the space below the piston at any position of the piston including BDC.

I claim:

1. A fuel intake system for an internal combustion engine having fuel intake porting, a fuel intake channel communicating with the intake porting and extended therefrom to a fuel supply offset from the cylinder and providing for flow of fuel from said supply to the intake porting, a valve body in the fuel intake channel having two planar converging walls defining a wedge-shaped valve body structure having its base presented upstream of the fuel flow toward the fuel supply and having a transverse apex member presented downstream toward the intake porting, each of the converging walls having an inlet opening therein and a reed valve overlying each opening, the reed valves being connected with the valve body structure in regions remote from said apex member, with the edge portions of the reed valves adjacent the apex member free to flex away from said inclined walls and thereby uncover the inlet openings, and said apex member having a subsonic teardrop aerodynamic contour with the rounded surface thereof presented upstream of the direction of fuel flow toward the interior of the valve body.

* * * * *